United States Patent
Benjelloun Mlayah et al.

(10) Patent No.: US 11,247,910 B2
(45) Date of Patent: Feb. 15, 2022

(54) PROCESS FOR THE EXTRACTION OF SILICA

(71) Applicant: COMPAGNIE INDUSTRIELLE DE LA MATIERE VEGETALE—CIMV, Neuilly sur Sein (FR)

(72) Inventors: Bouchra Benjelloun Mlayah, Pompertuzat (FR); Michel Delmas, Auzeville-Tolosane (FR); Laurence Llovera, Castanet Tolsan (FR); Alvaro Tejado Etayo, Estella (FR)

(73) Assignee: COMPAGNIE INDUSTRIELLE DE LA MATIERE VEGETALE—CIMV, Neuilly sur Seine (FR)

( * ) Notice: Subject to any disclaimer, the term of this patent is extended or adjusted under 35 U.S.C. 154(b) by 451 days.

(21) Appl. No.: 15/758,250

(22) PCT Filed: Aug. 18, 2016

(86) PCT No.: PCT/EP2016/069586
§ 371 (c)(1),
(2) Date: Mar. 7, 2018

(87) PCT Pub. No.: WO2017/042011
PCT Pub. Date: Mar. 16, 2017

(65) Prior Publication Data
US 2018/0251379 A1 Sep. 6, 2018

(30) Foreign Application Priority Data
Sep. 9, 2015 (EP) .................................. 15184491

(51) Int. Cl.
*C01B 33/12* (2006.01)
*C01B 33/193* (2006.01)
*B01D 11/02* (2006.01)

(52) U.S. Cl.
CPC .......... *C01B 33/126* (2013.01); *B01D 11/028* (2013.01); *B01D 11/0288* (2013.01); *B01D 11/0292* (2013.01); *C01B 33/193* (2013.01)

(58) Field of Classification Search
CPC . B01D 11/028; B01D 11/292; B01D 11/0288; B01D 11/02; C01B 33/126; C01B 33/193; C01B 33/00
See application file for complete search history.

(56) References Cited

U.S. PATENT DOCUMENTS 5,597,714 A * 1/1997 Farone ..................... C13K 1/02
435/100
8,551,747 B2 * 10/2013 Delmas .................... C08H 6/00
435/161

FOREIGN PATENT DOCUMENTS

WO WO00/68494 11/2000
WO WO 2004/073600 9/2004
(Continued)

OTHER PUBLICATIONS

Nur Syakilla Hassan et al: "Silica 11,12 Extraction from Rice Husk by Warm Water Pretreatment", Advanced Materials Research, vol. 1087, Feb. 1, 2015 (Feb. 1, 2015), pp. 309-315, XP055249059, DOI: 10.4028/www.scientific.net/AMR.1087.309 p. 310, paragraph 1—p. 310, paragraph 3.

(Continued)

*Primary Examiner* — Smita S Patel
(74) *Attorney, Agent, or Firm* — Nixon & Vanderhye

(57) ABSTRACT

Disclosed is a process for the extraction of silica from lignocellulosic plant matter, including the steps of: a) fractionating the lignocellulosic plant matter in the presence of an acid solution, so as to obtain a solid fraction including cellulose; b) extracting the silica from the solid fraction obtained in step a) with a basic solution, at a pH between 10 and 13 and at a temperature between 70° C. and 90° C., so (Continued)

as to obtain a liquid phase including silica and a solid phase; c) separating the liquid phase and of the solid phase which are obtained in step b); and d) precipitating the silica which is included in the liquid phase, at a pH between 5 and 6.

13 Claims, 1 Drawing Sheet

(56) References Cited

FOREIGN PATENT DOCUMENTS

| | | |
|---|---|---|
| WO | WO2009/092749 | 7/2009 |
| WO | WO2011/154293 | 12/2011 |
| WO | WO2012/049054 | 4/2012 |

OTHER PUBLICATIONS

A Carnelli: "Biogenic Silica Production in Selected Alpine Plant Species and Plant Communities", Annals of Botany., vol. 87, No. 4, Apr. 1, 2001 (Apr. 1, 2001), pp. 425-434, XP055249054, GB ISSN: 0305-7364, D0I: 10. 1006/anbo.2000. 1355 p. 426, col. 2, paragraph 2—p. 427, col. 1, paragraph 1.

R. Yuvakkumar et al: "Hi gh-purity nano silica powder from rice husk using a simple chemical method", Journal of Experimental Nanoscience, vol. 9, No. 3, Jul. 4, 2012 (Jul. 4, 2012), pp. 272-281, XP055249061,GB ISSN: 1745-8080, D0I: 10.1080/17458080.2012. 656709 paragraph [2.1.].

Yujiao et al., "Preparation and utilization of biochar and biochar composites," Jilin University-China, Jun. 6, 2015.

\* cited by examiner

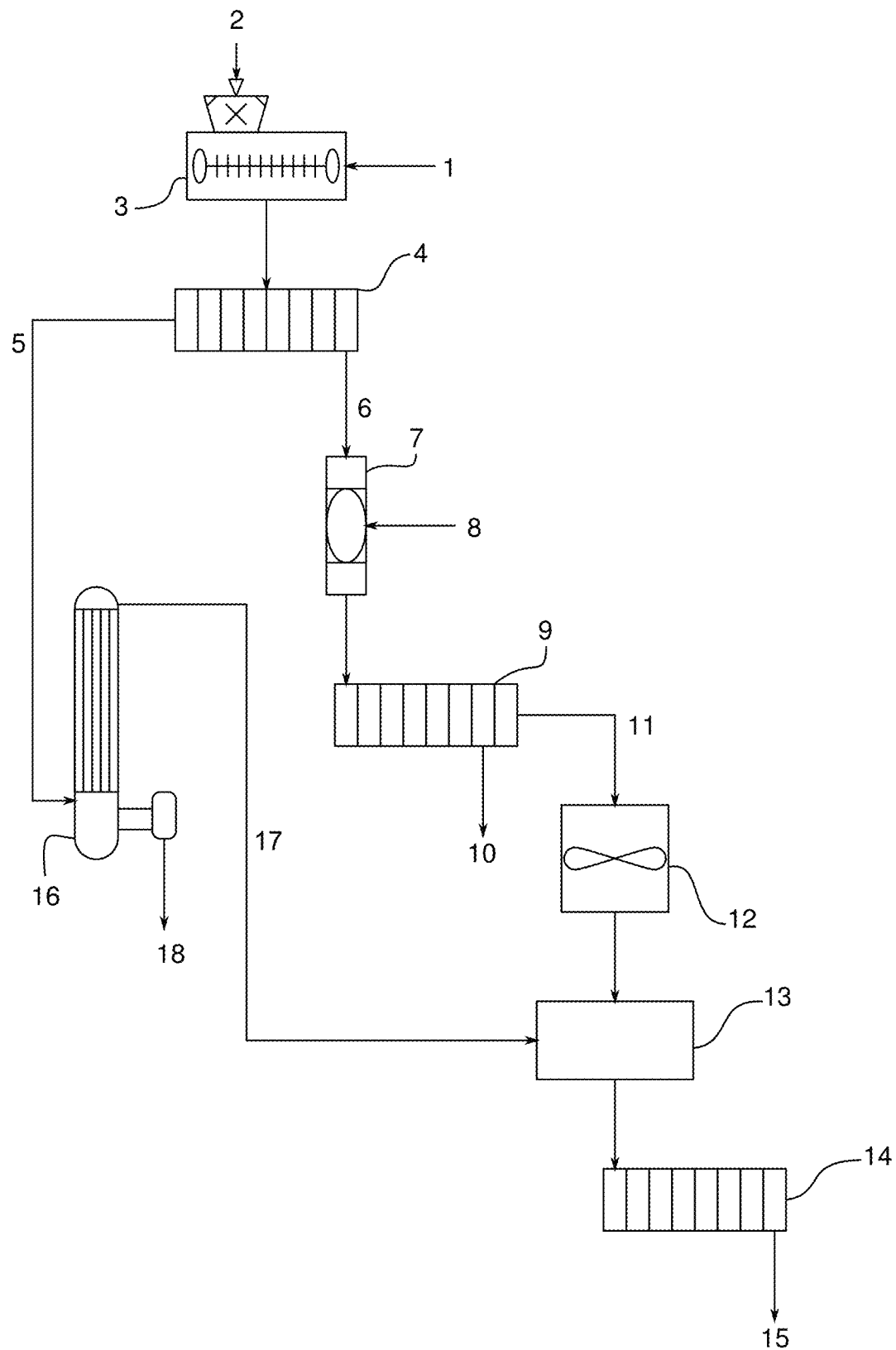

PROCESS FOR THE EXTRACTION OF SILICA

TECHNICAL FIELD OF THE INVENTION

The invention relates to a process and an installation for the extraction of silica from lignocellulosic plant matter.

TECHNOLOGICAL BACKGROUND

Silica is used in a large number of applications, whether in the field of optics, the motor industry or electronics.

The silica used in these applications is mainly of mineral origin.

However, there exists another not insignificant source of silica. Some plant matters, such as cereals, are very rich in silica. Thus, rice straw can comprise more than 10% of silica. The straw and the chaff resulting from the cultivation of cereals thus represent a considerable source of silica. In point of fact, these plant wastes are made use of only to a slight extent and, when they are made use of, the silica often limits their use. The silica is in particular a major obstacle to the use of cereal straw in the production of paper pulp. The commonest technique for the extraction of silica from plant wastes consists of their combustion. However, the quality of the silica obtained by combustion is mediocre. This is because the silica thus obtained exhibits a low purity and the silica particles have high diameters. Furthermore, the combustion of these wastes has a negative impact on the environment. It results in particular in emissions of sulphur and of nitrogen oxide. Finally, by burning these wastes, advantageous organic compounds which might be recycled are lost.

OBJECTIVES OF THE INVENTION

The invention is targeted at overcoming at least some of the disadvantages of the known processes and installations for the extraction of silica from lignocellulosic plant matter.

The invention is targeted in particular at providing, in at least one embodiment, a process and an installation for the extraction of silica from lignocellulosic plant matter without destroying the combination of the other advantageous compounds present in this plant matter. In particular, the invention is targeted at providing, in at least one embodiment, a process and an installation which make it possible to extract the silica but also paper pulp, lignin and/or sugars.

The invention is also targeted at providing, in at least one embodiment of the invention, a process and an installation which make it possible to recover between 70% and 80% of the silica present in the lignocellulosic plant matter.

The invention is also targeted at providing, in at least one embodiment of the invention, a process and an installation which make it possible to obtain silica having a high purity.

The invention is also targeted at providing, in at least one embodiment of the invention, a process and an installation which make it possible to obtain silica in the form of particles having a small diameter.

SUMMARY OF THE INVENTION

In order to do this, the invention relates to a process for the extraction of silica from lignocellulosic plant matter, characterized in that it comprises the steps of:

a) fractionating the lignocellulosic plant matter in the presence of an acid solution, so as to obtain a solid fraction comprising cellulose, b) extracting the silica from the solid fraction obtained in step a) with a basic solution, at a pH between 10 and 13 and at a temperature between 70° C. and 90° C., so as to obtain a liquid phase comprising silica and a solid phase, c) separating the liquid phase and of the solid phase which are obtained in step b), d) precipitating the silica which is comprised in the liquid phase, at a pH between 5 and 6.

The present invention also relates to the silica extracted according to this process.

The invention also relates to an installation for the extraction of silica from lignocellulosic plant matter, characterized in that it comprises:

a fractionating unit:
comprising an acid solution feed,
suitable for separating a solid fraction and a liquid fraction, and
comprising a liquid fraction outlet and a solid fraction outlet, the solid fraction outlet being connected to an extracting unit,
the extracting unit:
comprising a basic solution feed,
being suitable for separating a solid phase and a liquid phase, and
comprising a solid phase outlet and a liquid phase outlet, the outlet of the liquid phase being connected to a precipitating unit,
the precipitating unit comprising an acid solution feed.

DETAILED DESCRIPTION

The first step of the process according to the invention comprises fractionating the lignocellulosic plant matter in the presence of an acid solution, so as to obtain a solid fraction comprising cellulose.

The lignocellulosic plant matter can be any type of lignocellulosic plant matter which comprises silica. In particular, the lignocellulosic plant matter can be cereal straw and/or chaff. Cereals are rich in silica. The straw and the chaff resulting from their cultivation represent considerable amounts of agricultural waste which can be recovered in value. The cereals used in the process according to the invention can, for example, be wheat, rice, maize or barley. Thus, the lignocellulosic plant matter can be wheat or rice straw and/or wheat or rice chaff. According to an embodiment, the lignocellulosic plant matter is wheat straw. According to another embodiment, the lignocellulosic plant matter is rice straw. The latter is particularly rich in silica.

Prior to the fractionating step, care is preferably taken that the humidity of the lignocellulosic plant matter is less than or equal to 25% by weight of water with respect to the dry matter. Grinding of the lignocellulosic plant matter is preferably carried out so as to reduce it to fragments or slivers with a length substantially of between 0.5 and 20 cm. Before the fractionating step, it is also possible to carry out a preimpregnation of the lignocellulosic plant matter lower by at least 30° C. than the reaction temperature. The impregnation by immersion can be carried out for a period of time of 10 to 30 min in a formic acid/acetic acid mixture.

Fractionating lignocellulosic plant matter in the presence of an acid solution is known. Such fractionations and the steps prior to this fractionation are in particular described in Patent Applications WO00/68494, WO2009/092749 and WO2012/049054 of Compagnie Industrielle de la Matière Végétale (CIMV).

Fractionating plant matter in an acid medium makes it possible to retain the silica in the solid fraction comprising cellulose in order to be able to extract it during a subsequent step. This type of fractionation is contrary to the general practice which, in the case of plant matter having a high silica content, recommends carrying out a fractionation in a basic medium in order to remove the silica right from the step of fractionation of the cellulose and thus to prevent the silica from interfering with the extraction of the cellulose but also that of the sugars and of the lignin present in the plant matter.

According to a preferred embodiment, the fractionating step a) comprises the steps of:

a1) bringing the lignocellulosic plant matter into contact with an acid solution, so as to obtain a solid fraction comprising cellulose and a liquid fraction, a2) separating the solid fraction and the liquid fraction which are obtained in step a1).

The operation in which the lignocellulosic plant matter is brought into contact with an acid solution can be carried out at a temperature between 50° C. and 115° C., preferably between 95° C. and 110° C.

Preferably, the operation in which the lignocellulosic plant matter is brought into contact with an acid solution lasts from 1 to 3 hours.

The acid solution of the fractionating step a) can comprise at least one organic acid. The acid solution of the fractionating step a) can in particular comprise formic acid and/or acetic acid.

According to a preferred embodiment, the acid solution of the fractionating step a) is a solution of organic acid(s), preferably a solution of formic acid and/or acetic acid. Preferably, the acid solution of the fractionating step a) is a mixture of formic acid and acetic acid. This mixture of formic acid and acetic acid can comprise at least 20% by weight of acetic acid and at least 50% by weight of formic acid.

Fractionating with a mixture of acetic acid and formic acid makes it possible to avoid the damage to the cellulose fibres which appears with concentrated formic acid alone under the normal conditions of use. Thus, the quality of the paper pulp which will be able to be obtained from the solid fraction comprising cellulose once the silica has been extracted therefrom is retained.

According to a preferred embodiment, the lignocellulosic plant matter is brought together with a mixture of formic acid comprising at least 5% of acetic acid by weight and the combination is brought to a reaction temperature of between 50° C. and 115° C., the solid fraction is subsequently separated from the liquid fraction comprising in particular, in solution, the starting formic acid and acetic acid, dissolved monomeric and polymeric sugars, lignins and acetic acid which result from the starting lignocellulosic plant matter.

Typically, the liquid fraction obtained during the separating step a1) comprises lignin. It can also comprise sugar and/or hemicellulose. This liquid fraction can be subjected to various treatments in order to recover some of the compounds which it comprises. In particular, it can be treated, for example by evaporation, in order to recycle the acid solution. Thus, if a mixture of acetic acid and formic acid is used during step a), it can be extracted from the liquid fraction obtained in step a2). This mixture can then be recycled in the steps requiring the addition of an acid solution of this type.

The lignin and the sugars of this liquid fraction can also be purified. The sugar thus purified can in particular be fermented in order to obtain ethanol. Processes for the purification of the lignin and of the sugar from such a liquid fraction are known. They are in particular described in Patent Application WO2011/154293 of CIMV.

As the fractionation takes place in an acid medium, the silica remains in the solid fraction and is not discharged in the liquid fraction. Consequently, the optional treatments of this liquid fraction no longer encounter the disadvantages relating to the presence of silica.

The solid fraction obtained during step a) comprises cellulose. The cellulose included in this fraction preferably consists of the majority of the cellulose included in the lignocellulosic plant matter.

The second step of the process according to the invention comprises the extraction of the silica from the solid fraction obtained in step a) with a basic solution, at a pH between 10 and 13 and at a temperature between 70° C. and 90° C., so as to obtain a liquid phase comprising silica and a solid phase.

During this extracting step, the silica present in the solid fraction obtained in step a) dissolves in the form of silicate. A liquid phase comprising silica and a solid phase comprising cellulose but depleted in silica, that is to say purified from the silica which it comprises, are then obtained.

The extracting step can last between 30 and 60 min.

The conditions of this step and in particular the pH of this step make it possible to control the amount of residual lignin and, for this reason, the purity of the silica.

The extracting step b) is carried out at a pH between 10 and 13.

According to a preferred embodiment, the extracting step b) is carried out at a pH between 10.5 and 12.5, preferably between 10.5 and 11.5.

Such a pH range makes it possible to obtain silica particles with a diameter of a few micrometers. The role of the pH during the extracting step with regard to the size of the silica particles is particularly surprising. This is because only the parameters of the precipitating step appeared to have an influence on this diameter.

Furthermore, the pH also plays a role in the purity of the silica. An extraction pH of between 10 and 11.5 makes it possible to notably reduce the amount of residual lignin present in the silica.

The basic solution of the extracting step b), also referred to as extraction solution, can be a sodium hydroxide or potassium hydroxide solution.

The basic solution of the extracting step b) can, for example, comprise between 2% and 5% by weight of NaOH. Preferably, it comprises 1.5% by weight of NaOH.

The third step of the process according to the invention comprises separating the liquid phase and of the solid phase which are obtained in the extracting step b).

This separating step can be carried out by the normal techniques for solid-liquid separation, for example by separation by settling, by filtration, for example via a filter press, or by centrifugation.

The process according to the invention can comprise a step of concentrating the liquid phase after the separating step c) and before the precipitating step d) in order to increase the precipitation yield.

Preferably, the liquid phase is concentrated so as to comprise 10% of dry matter.

The fourth step of the process according to the invention comprises precipitating the silica which is comprised in the liquid phase at a pH between 5 and 6. The precipitation of the silica which is comprised in the liquid phase can be carried out directly after the separating step c) without a prior concentrating step or after the concentrating step. Preferably, the precipitating step is carried out after a step of concentrating the liquid phase. By optimizing the conditions of the extracting step b), silica with a desired purity and a desired diameter is obtained. Thus, according to this process, it is no longer necessary to use specific precipitation conditions, for example, in order to reduce the diameter of the silica particles.

The precipitation of the silica at a pH between 5 and 6 can be carried out by the addition of an acid solution, preferably with an acid solution obtained by recycling the liquid fraction obtained subsequent to the separating step a2). The recycling of the acid solution makes it possible to limit the contribution of reactant and thus the cost of the process.

Likewise, in order to limit the contribution of reactant, the acid solution used during the fractionating step can also originate from the recycling of the liquid fraction.

Once the silica has been precipitated, it can be washed in order to remove the residual salts or any other impurity.

The precipitated silica can subsequently be filtered, for example by filtration on a centrifuge.

The silica is then recovered.

The invention also relates to the silica extracted according to the process described above.

The silica extracted according to the process of the invention is of plant origin.

The silica extracted according to the process of the invention can comprise residual lignin. According to one embodiment, the process according to the invention can comprise a step of combustion of the silica. The non-mineral impurities, in particular the impurities such as the residual lignin, can thus be removed from the silica.

The silica particles extracted according to the process of the invention can exhibit a mean diameter of 3 µm to 200 µm. The mean diameter of the particles varies as a function of the extraction conditions. At a pH between 10.5 and 11.5, an apparent mean diameter of 1 µm to 10 µm can be obtained. It is thus no longer necessary to use additional steps, such as sonication, in order to reduce the size of the particles.

The invention also relates to an installation for the implementation of the process according to the invention.

In particular, the invention relates to an installation for the extraction of silica from lignocellulosic plant matter, characterized in that it comprises:
a fractionating unit:
comprising an acid solution feed,
suitable for separating a solid fraction and a liquid fraction, and
comprising a liquid fraction outlet and a solid fraction outlet, the solid fraction outlet being connected to an extracting unit,
the extracting unit:
comprising a basic solution feed,
being suitable for separating a solid phase and a liquid phase, and
comprising a solid fraction outlet and a liquid phase outlet, the outlet of the liquid phase being connected to a precipitating unit,
the precipitating unit comprising an acid solution feed.

According to a preferred embodiment, the liquid fraction outlet of the fractionating unit is connected to a recycling unit suitable for recycling an acid solution. The recycling unit comprises a recycled acid solution outlet connected to the acid solution feed of the precipitating unit.

The invention will be illustrated below by the following FIGURES and examples. However, these examples and FIGURES should not be interpreted so as to limit the scope of the present invention.

FIGURE

FIG. 1 is a partial and diagrammatic view of the process and installation according to the invention.

The lignocellulosic plant matter is introduced via the pipe 1 into the reactor 3, in which the lignocellulosic plant matter is brought into contact with an acid solution in order to obtain a solid fraction comprising cellulose and a liquid fraction comprising lignin and sugar. The acid solution is introduced into the reactor 3 via the pipe 2. The combination comprising the liquid and solid fractions is transferred into a press 4 in order to separate the two fractions. The reactor 3 and the press 4 form the fractionating unit 3,4.

The liquid fraction is sent to a recycling unit 16 via the liquid fraction outlet 5. The liquid fraction is treated therein by evaporation in order to obtain a recycled acid solution. This solution is recovered via the pipe 17. The other constituents of the liquid fraction, such as the lignin or sugar, can also be recovered via the outlet 18 and purified.

The solid fraction is sent to an extraction reactor via the pipe 6. The solid fraction is brought into contact therein with a basic extraction solution introduced via the pipe 8. This extracting step is carried out at a pH of between 10.5 and 11.5 at a temperature between 70° C. and 90° C. The silica present in the solid fraction then dissolves in the extraction solution, forming a liquid phase comprising silica and a solid phase comprising cellulose and depleted in silica.

The combination consisting of the solid phase and the liquid phase is subsequently introduced into a press 9 in order to separate them. The extraction reactor 7 and the press 9 form the extracting unit 7,9.

The solid phase thus separated is recovered via the pipe 10. This solid phase can be subjected to various treatments in order to recover in value the cellulose which it comprises.

The liquid phase is concentrated in the unit 12 and then precipitated in the precipitating unit 13 by adjustment of the pH to a pH between 5 and 6. The adjustment of the pH is carried out by the recycled acid solution originating from the pipe 17.

The precipitated silica is subsequently filtered in the filtration unit 14.

The silica is recovered via the pipe 15.

EXAMPLE

Materials and Methods

The fractionating step was carried out with a solution of acetic acid/formic acid/water for a period of time of 3 hours, at a temperature of 105° C. and at pH 3.
The extracting step was carried out with a 12% by weight sodium hydroxide solution, for a period of time of 60 min, at a temperature of 80° C. and at pH 10.5 or at pH 12.5.
The precipitating step was carried out with a 1% acetic acid solution, for a period of time of 10 min, at a temperature of 25° C. and at pH 5.5.

Results

The results obtained are combined in Table 1 below.

TABLE 1

| Silica particles | Extraction at pH 10.5 | Extraction at pH 12.5 |
|---|---|---|
| Mean diameter by laser particle sizing | 4.8 µm | 176 µm |

TABLE 1-continued

| Silica particles | Extraction at pH 10.5 | Extraction at pH 12.5 |
|---|---|---|
| Specific surface by the BET method | 155.93 m$^2$/g | 413.46 m$^2$/g |
| Cumulative pore volume by the BJH adsorption method | 0.28 cm$^3$/g | 1.21 cm$^3$/g |
| Mean pore diameter by the BJH adsorption method | 8.2282 nm | 11.0661 nm |
| Median pore diameter | 0.9441 nm | 0.9326 nm |

These results show that the size of the silica particles decreases greatly with the pH of the extraction solution.

The invention claimed is:

1. A process for an extraction of a silica from lignocellulosic plant matter, comprising the steps of:
 a) fractionating the lignocellulosic plant matter in a presence of an acid solution, so as to obtain a solid fraction comprising cellulose,
 b) extracting the silica from the solid fraction obtained in step a) with a basic solution, at a pH between 10.5 and 11.5 and at a temperature between 70° C. and 90° C., so as to obtain a liquid phase comprising the silica and a solid phase,
 c) separating the liquid phase and the solid phase which are obtained in step b),
 d) precipitating the silica which is comprised in the liquid phase, at a pH between 5 and 6,
  wherein the precipitated silica comprises silica particles have an apparent mean diameter of 1-10 micrometers obtained at the pH between 10.5 and 11.5 in step b), and
  wherein the apparent mean diameter is achieved without the need to use sonication or other additional steps to reduce the size of the silica particles.

2. The process for an extraction of a silica according to claim 1, wherein the fractionating step a) comprises the steps of:
 a1) bringing the lignocellulosic plant matter into contact with the acid solution, so as to obtain a solid fraction comprising cellulose and a liquid fraction,
 a2) separating the solid fraction and the liquid fraction which are obtained in step a1).

3. The process for an extraction of silica according to claim 2, wherein the precipitating step d) is carried out with the acid solution obtained by recycling the liquid fraction obtained subsequent to the separating step a2).

4. The process for an extraction of a silica according to claim 3, wherein the acid solution of the fractionating step a) is a solution of organic acid.

5. The process for an extraction of a silica according to claim 3, wherein the acid solution of the fractionating step a) is a solution of formic acid and/or of acetic acid.

6. The process for an extraction of a silica according to claim 2, wherein the acid solution of the fractionating step a) is a solution of organic acid.

7. The process for an extraction of a silica according to claim 2, wherein the acid solution of the fractionating step a) is a solution of formic acid and/or of acetic acid.

8. The process for an extraction of silica according to claim 1, wherein the acid solution of the fractionating step a) is a solution of organic acid.

9. The process for an extraction of a silica according to claim 1, wherein the acid solution of the fractionating step a) is a solution of formic acid and/or of acetic acid.

10. The process for an extraction of a silica according to claim 1, wherein the basic solution of the extracting step b) comprises 1.5% by weight of NaOH.

11. The process for an extraction of a silica according to claim 1, wherein the lignocellulosic plant matter is cereal straw and/or chaff.

12. The process for an extraction of a silica according to claim 1, comprising a step of concentrating the liquid phase after the separating step c) and before the precipitating step d).

13. The process for an extraction of a silica according to claim 1, comprising a step of filtration of the silica precipitated in step d).

* * * * *